US012699704B2

(12) United States Patent
Winslow et al.

(10) Patent No.: US 12,699,704 B2
(45) Date of Patent: Aug. 4, 2026

(54) SYSTEMS AND METHODS FOR DISAMBIGUATING TIME-SERIES DATA GENERATED BY MONITORING DEVICES

(71) Applicant: The Johns Hopkins University, Baltimore, MD (US)

(72) Inventors: Raimond L. Winslow, Phoenix, MD (US); Stephen J. Granite, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 18/697,272

(22) PCT Filed: Sep. 30, 2022

(86) PCT No.: PCT/US2022/045439
§ 371 (c)(1),
(2) Date: Mar. 29, 2024

(87) PCT Pub. No.: WO2023/056055
PCT Pub. Date: Apr. 6, 2023

(65) Prior Publication Data
US 2024/0403308 A1      Dec. 5, 2024

Related U.S. Application Data

(60) Provisional application No. 63/250,335, filed on Sep. 30, 2021.

(51) Int. Cl.
*G06F 16/2458*      (2019.01)
(52) U.S. Cl.
CPC ............................... *G06F 16/2477* (2019.01)

(58) Field of Classification Search
CPC ........................ G06F 16/2477; G06F 2123/02
See application file for complete search history.

(56) References Cited

U.S. PATENT DOCUMENTS 7,249,117 B2     7/2007  Estes
9,058,317 B1     6/2015  Gardner et al.
(Continued)

FOREIGN PATENT DOCUMENTS

WO     WO 2019/028448 A1     2/2019
WO     WO 2019/191644 A1     10/2019

OTHER PUBLICATIONS

International Preliminary Report on Patentability in International Appln. No. PCT/US2022/045439, mailed on Apr. 11, 2024, 7 pages.
(Continued)

*Primary Examiner* — William P Bartlett
(74) *Attorney, Agent, or Firm* — Fish & Richardson P.C.

(57) ABSTRACT

Systems, methods, and computer programs for disambiguating time-series data generating by a monitoring device. In one aspect, the method can include obtaining entity independent time-series data broadcast by a monitoring device, determining, based on the obtained entity independent time-series data, one or more attributes of the entity independent time-series data, generating a query that includes the one or more attributes of the entity independent time-series data, executing the generated query against an entity database to obtain query results that identify an entity, and generating data that associates the obtained entity independent time-series data with the identified entity.

12 Claims, 5 Drawing Sheets

(56) References Cited

U.S. PATENT DOCUMENTS

| | | | |
|---|---|---|---|
| 10,553,312 B2 | 2/2020 | Bernard et al. | |
| 2005/0228238 A1* | 10/2005 | Monitzer | G16H 10/60 |
| | | | 600/509 |
| 2006/0173715 A1 | 8/2006 | Wang | |
| 2009/0231124 A1* | 9/2009 | Klabunde | G16H 40/20 |
| | | | 340/539.12 |
| 2012/0041277 A1 | 2/2012 | Ebadollahi et al. | |
| 2012/0117079 A1 | 5/2012 | Baum et al. | |
| 2012/0117099 A1* | 5/2012 | Gross | G06F 16/215 |
| | | | 707/758 |
| 2013/0103657 A1* | 4/2013 | Ikawa | G06F 16/2477 |
| | | | 707/693 |
| 2013/0238619 A1* | 9/2013 | Hanaoka | G06F 16/245 |
| | | | 707/769 |
| 2016/0012015 A1 | 1/2016 | Tran et al. | |
| 2016/0154852 A1* | 6/2016 | Chen | G06F 16/2477 |
| | | | 707/769 |
| 2017/0017764 A1* | 1/2017 | Tsugo | G16H 40/63 |
| 2017/0270418 A1 | 9/2017 | Reschke et al. | |
| 2017/0329828 A1* | 11/2017 | Gupta | G06F 16/9535 |
| 2018/0060499 A1 | 3/2018 | Hu et al. | |
| 2018/0089376 A1 | 3/2018 | Tucker et al. | |
| 2018/0121546 A1 | 5/2018 | Dingwall et al. | |
| 2018/0225960 A1 | 8/2018 | Al-Ali et al. | |
| 2019/0097904 A1* | 3/2019 | Park | H04L 43/045 |
| 2019/0304582 A1 | 10/2019 | Blumenthal et al. | |
| 2020/0058383 A1 | 2/2020 | Birnbaum et al. | |
| 2020/0337648 A1* | 10/2020 | Saripalli | G16H 10/60 |
| 2022/0215948 A1* | 7/2022 | Bardot | G16H 40/40 |

OTHER PUBLICATIONS

International Search Report and Written Opinion in International Appln. No. PCT/US2022/045439, mailed on Mar. 2, 2023, 10 pages.
Invitation to Pay Additional Fees in International Appln. No. PCT/US2022/045439, mailed on Jan. 5, 2023, 2 pages.
Scott et al., "A Common Model for Longitudinal Visualization of Patient Data," Abstract, Presented at ACTRIMS 2019, Dallas, Texas, Feb. 28-Mar. 2, 2019; Multiple Sclerosis Journal, May 7, 2019, 25(S1):111.
Scott et al., "A Common Model for Longitudinal Visualization of Patient Data," Poster, Presented at ACTRIMS 2019, Dallas, Texas, Feb. 28-Mar. 2, 2019, 1 page.

* cited by examiner

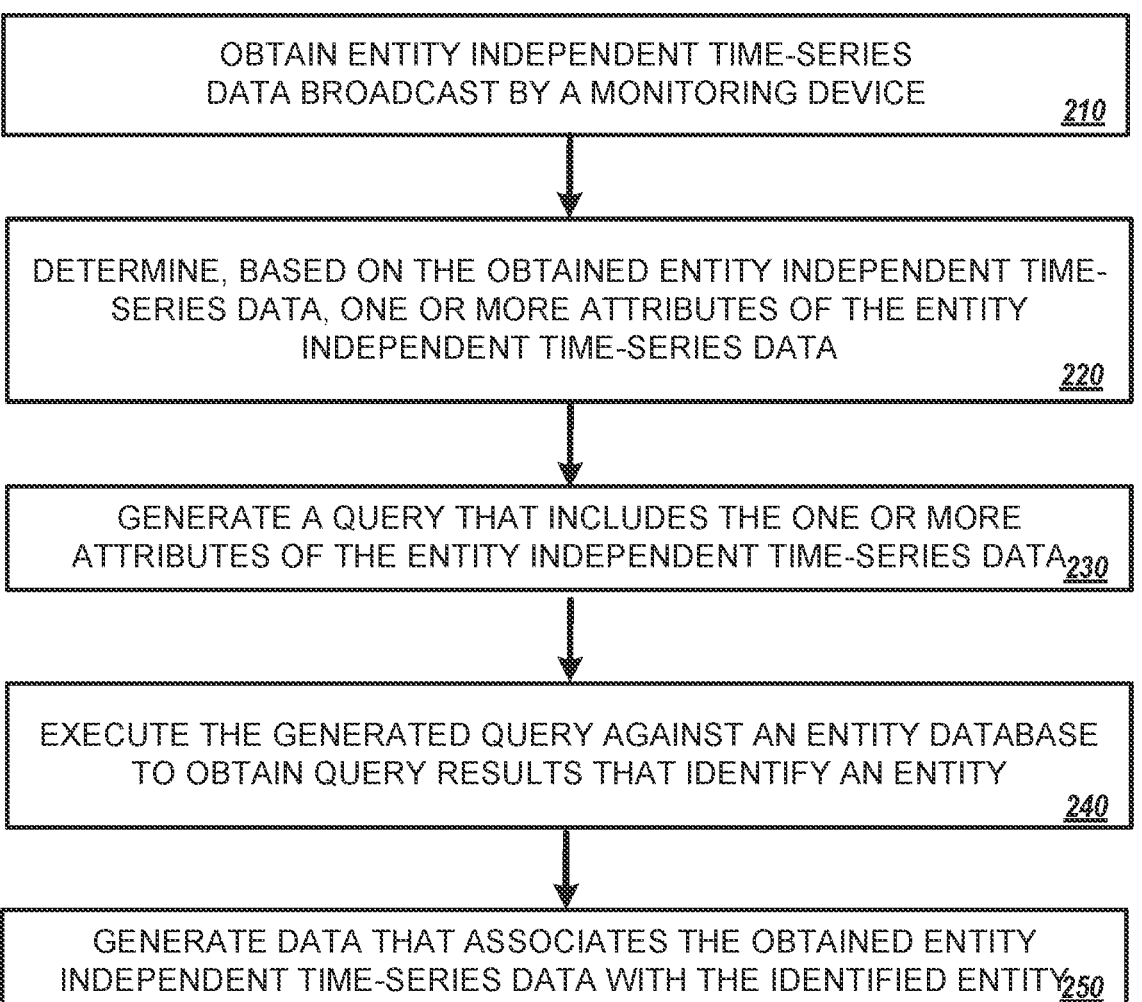

200

OBTAIN ENTITY INDEPENDENT TIME-SERIES
DATA BROADCAST BY A MONITORING DEVICE          _210_

DETERMINE, BASED ON THE OBTAINED ENTITY INDEPENDENT TIME-
SERIES DATA, ONE OR MORE ATTRIBUTES OF THE ENTITY
INDEPENDENT TIME-SERIES DATA          _220_

GENERATE A QUERY THAT INCLUDES THE ONE OR MORE
ATTRIBUTES OF THE ENTITY INDEPENDENT TIME-SERIES DATA_230_

EXECUTE THE GENERATED QUERY AGAINST AN ENTITY DATABASE
TO OBTAIN QUERY RESULTS THAT IDENTIFY AN ENTITY          _240_

GENERATE DATA THAT ASSOCIATES THE OBTAINED ENTITY
INDEPENDENT TIME-SERIES DATA WITH THE IDENTIFIED ENTITY_250_

FIG. 2

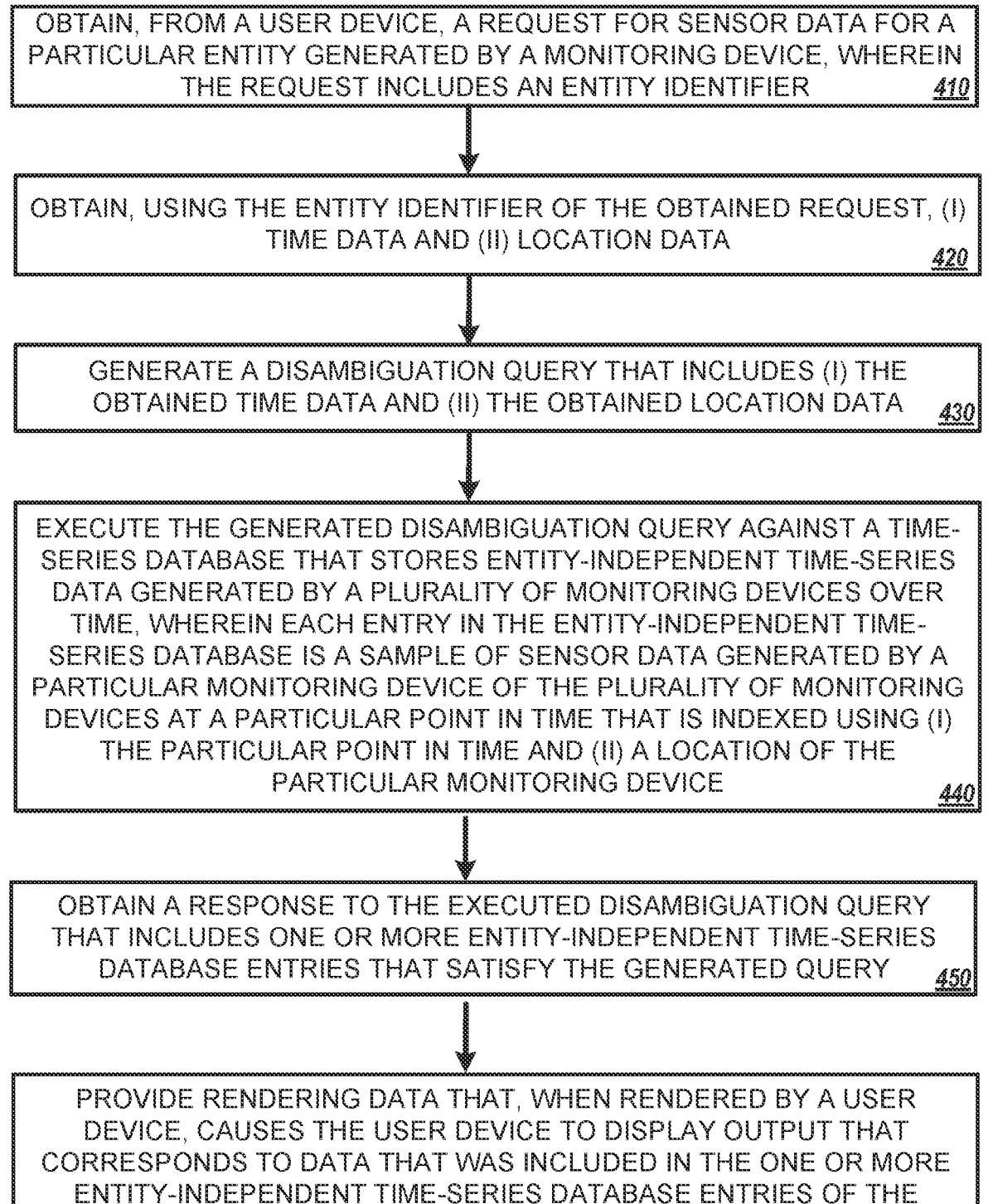

OBTAIN, FROM A USER DEVICE, A REQUEST FOR SENSOR DATA FOR A PARTICULAR ENTITY GENERATED BY A MONITORING DEVICE, WHEREIN THE REQUEST INCLUDES AN ENTITY IDENTIFIER    *410*

OBTAIN, USING THE ENTITY IDENTIFIER OF THE OBTAINED REQUEST, (I) TIME DATA AND (II) LOCATION DATA    *420*

GENERATE A DISAMBIGUATION QUERY THAT INCLUDES (I) THE OBTAINED TIME DATA AND (II) THE OBTAINED LOCATION DATA    *430*

EXECUTE THE GENERATED DISAMBIGUATION QUERY AGAINST A TIME-SERIES DATABASE THAT STORES ENTITY-INDEPENDENT TIME-SERIES DATA GENERATED BY A PLURALITY OF MONITORING DEVICES OVER TIME, WHEREIN EACH ENTRY IN THE ENTITY-INDEPENDENT TIME-SERIES DATABASE IS A SAMPLE OF SENSOR DATA GENERATED BY A PARTICULAR MONITORING DEVICE OF THE PLURALITY OF MONITORING DEVICES AT A PARTICULAR POINT IN TIME THAT IS INDEXED USING (I) THE PARTICULAR POINT IN TIME AND (II) A LOCATION OF THE PARTICULAR MONITORING DEVICE    *440*

OBTAIN A RESPONSE TO THE EXECUTED DISAMBIGUATION QUERY THAT INCLUDES ONE OR MORE ENTITY-INDEPENDENT TIME-SERIES DATABASE ENTRIES THAT SATISFY THE GENERATED QUERY    *450*

PROVIDE RENDERING DATA THAT, WHEN RENDERED BY A USER DEVICE, CAUSES THE USER DEVICE TO DISPLAY OUTPUT THAT CORRESPONDS TO DATA THAT WAS INCLUDED IN THE ONE OR MORE ENTITY-INDEPENDENT TIME-SERIES DATABASE ENTRIES OF THE OBTAINED RESPONSE    *460*

FIG. 4

SYSTEMS AND METHODS FOR DISAMBIGUATING TIME-SERIES DATA GENERATED BY MONITORING DEVICES

CROSS-REFERENCE TO RELATED APPLICATIONS

This application is a National Stage application under 35 U.S.C. § 371 of International Application No. PCT/US2022/045439 having an International Filing Date of Sep. 30, 2022, which claims the benefit of U.S. Provisional Patent Application No. 63/250,335, filed on Sep. 30, 2021. The disclosure of the prior applications are considered part of the disclosure of this application, and are incorporated in their entirety into this application.

BACKGROUND

This disclosure relates to storage and retrieval of entity-independent time-series data.

SUMMARY

According to one innovative aspect of the present disclosure, a method for disambiguating time-series data generating by a monitoring device is disclosed. In one aspect, the method can include actions of obtaining, by one or more computers, entity independent time-series data broadcast by a monitoring device, determining, by one or more computers and based on the obtained entity independent time-series data, one or more attributes of the entity independent time-series data, generating, by one or more computers, a query that includes the one or more attributes of the entity independent time-series data, executing, by one or more computers, the generated query against an entity database to obtain query results that identify an entity, and generating, by one or more computers, data that associates the obtained entity independent time-series data with the identified entity.

Other aspects includes systems, apparatus, and computer programs for performing the actions of the aforementioned methods.

The innovative method can include other optional features. For example, in some implementations, the entity independent time-series data broadcast by a monitoring device includes time-series data that does not include an entity identifier.

In some implementations, the one or more attributes of the entity independent time-series data include a date associated with the entity independent time-series data, a period of time associated with entity independent time-series data, or a location associated with the entity independent time-series data.

In some implementations, the query results that identify an entity include an entity identifier, wherein the entity identifier is data that can be used to identify the entity.

In some implementations, the generated data that associates the obtained entity independent time-series data with the identified entity is a data structure that can include (i) a first field structuring an entity identifier that identifies the entity and (ii) one or more second fields that include at least a portion of the entity independent time-series data.

According to another innovative aspect of the present disclosure, another method for disambiguating time-series data generated by a monitoring device is disclosed. In one aspect, the method can include actions of obtaining, by one or more computers and from a user device, a request for sensor data for a particular entity generated by a monitoring device, wherein the request includes an entity identifier, obtaining, by one or more computers and using the entity identifier of the obtained request, (i) time data and (ii) location data, generating, by one or more computers, a disambiguation query that includes (i) the obtained time data and (ii) the obtained location data, executing, by one or more computers, the generated disambiguation query against a time-series database that stores entity-independent time-series data generated by a plurality of monitoring devices over time, wherein each entry in the entity-independent time-series database is a sample of sensor data generated by a particular monitoring device of the plurality of monitoring devices at a particular point in time that is indexed using (i) the particular point in time and (ii) a location of the particular monitoring device, obtaining, by one or more computers, a response to the executed disambiguation query that includes one or more entity-independent time-series database entries that satisfy the generated query, and providing, by one or more computers, rendering data that, when rendered by a user device, causes the user device to display output that corresponds to data that was included in the one or more entity-independent time-series database entries of the obtained response.

Other aspects includes systems, apparatus, and computer programs for performing the actions of the aforementioned methods The innovative method can include other optional features. For example, in some implementations, the sensor data includes high frequency data generated by the monitoring device or low frequency data generated by the monitoring device.

In some implementations, the monitoring device includes a sensor that is used to monitor one or more vital signs of the entity.

In some implementations, obtaining, by one or more computers and using the entity identifier of the obtained request, (i) time data and (ii) location data can include mapping, by one or more computers, the entity identifier of the obtained request to (i) time data and (ii) location data.

Ins some implementations, mapping, by one or more computers, the entity identifier of the obtained request to the (i) time data and (ii) location data can include generating, by one or more computers, a different query that includes entity identifier as a query parameter, executing, by one or more computers, a second query against an entity records database, wherein each entity record in the entity records database includes data that indicates (a) an entity identifier, (b) time data and (b) location data indicating a location of an entity identified by the entity identifier during a time period identified by the time data, and obtaining, by one or more computers, one or more entity records that satisfy the second query.

In some implementations, the time data can indicate a point in time when an entity was located in a location identified by the location data.

In some implementations, the location is a room of a hospital.

Other features and advantages of the invention will be apparent from the following detailed description, and from the claims.

BRIEF DESCRIPTION OF THE DRAWINGS

FIG. 2 is a flowchart of a process for disambiguating time-series data generated by a monitoring device prior to receipt of a request for retrieval of the time-series data.

FIG. 4 is a flowchart of a process for disambiguating time-series data generated by a monitoring device after receipt of a request for retrieval of the time-series data.

DETAILED DESCRIPTION

The present disclosure is directed towards systems, methods, and computer programs for disambiguating entity independent time-series data generated by a monitoring device. Entity independent time-series data is time-series data that does not include any data that identifies an entity to which the time-series data corresponds. The present disclosure provides a system and method that enables disambiguation of such entity independent time series data.

The present disclosure solves a problem in the art that arises, by way of example, in hospitals. In a hospital room of a hospital, a patient can be coupled to one or more monitoring devices that each include on more sensors that are configured to monitor one or more attributes of the patient. Such monitoring devices can include a blood pressure sensor, a heart-rate sensor, an oxygen-level sensor, a lipid profile sensor, or the like. These monitoring devices each generate measurement data that represents a current characterization of a particular attribute of the patient that is monitored by the monitoring device. In some implementations, the measurement data can include high frequency such as waveform data generated by a heart rate sensor or oxygen-level sensors. In other implementations, the measurement data can include low-frequency data such as a blood pressure measurement or a lactate measurement. A problem arises because conventional systems do not store the generated measurement data in manner associated with the entity that was monitored by the monitoring devices. In fact, the conventional systems do not store the generated measurement data at all. The only way the measurement data can be read is if a person or intelligent agent is observing the measurement data as it is being generated and output on a display device. As a result, a physician or other care provider can only avail themselves of current measurements being output in real-time when assessing a patient's health. Historical measurement data or trends in measurement data are available to the physician or other care provider.

Figure 1:
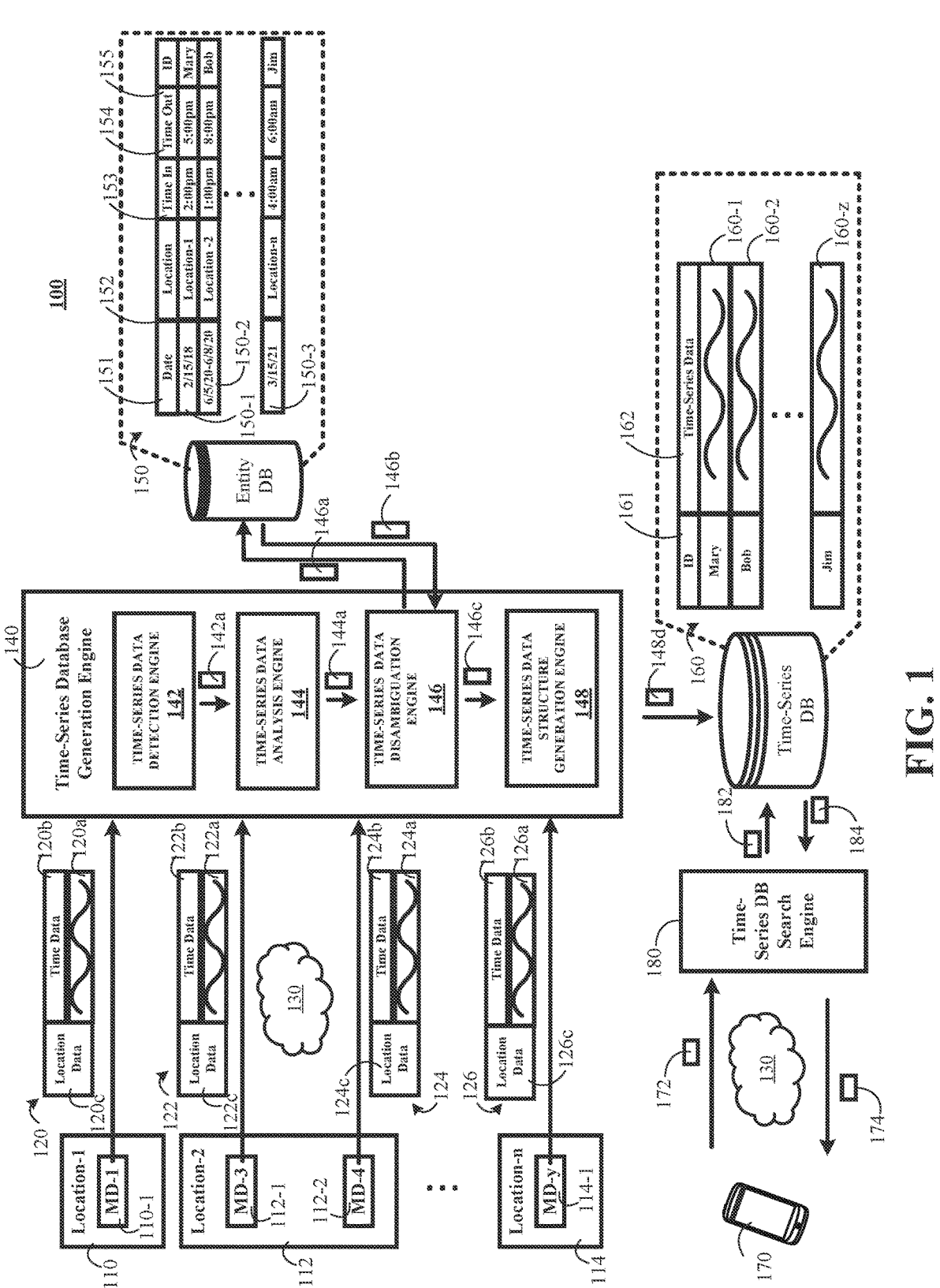
FIG. 1 is a diagram of a system for disambiguating time-series data generated by a monitoring device prior to receipt of a request for retrieval of the time-series data.

FIG. 1 is a diagram of a system 100 for disambiguating time-series data generated by a monitoring device prior to receipt of a request for retrieval of the time-series data. The system 100 can include multiple monitoring devices MD-1 110-1, MD-2 112-1, MD-3 112-2, MD-x 114-1, a network 130, a time-series database generation engine 140, an entity database 150, a time-series database 160, a user device 170, and a time-series database search engine 180. The monitoring devices can be referred to in a number of different ways herein. For example, monitoring device 110-1 can also be referred to as MD-1 or MD-1 110-1, each of which refers to the monitoring device that is located in location-1 110, which can also be referred to as location 110.

A monitoring device such as monitoring devices MD-1, MD-2, MD-3, MD-x can be any device that is configured to monitor an attribute of an entity such as human. Each monitoring device can include, for example, one or more of a heart rate sensor, one or more oxygen level sensor, one or more blood pressure sensors, one or more capillary blood oxygen saturation (sPO2) sensor, one or more intracranial pressure (ICP) sensors, or the like. The monitoring devices MD-1, MD-2, MD-3, MD-x can be located in one or more locations. In the example of FIG. 1, MD-1 is located in location-1 110, MD-2 and MD-3 are located in location-2 112, and MD-x is located in location-n 114, where x and n can be any positive integer greater than zero and need not be equal. The example of FIG. 1 includes a description of system that has one or two monitoring devices at each location 110, 112, 114. However, the present disclosure is not so limited. Instead, any number of monitoring devices can reside at each respective location 110, 112, 114.

Each location 110, 112, and 114 can be different locations within the same structure. For example, location 110, location 112, and location 114 can be different hospital rooms in a unit of a hospital, different hospital rooms in different units of a hospital, or the like. However, the locations need not be limited to the residing within the same structure. For example, location 110 can be located at a first structure, location 112 can be located in a different structure than the first structure, and location 114 can be located in yet another structure. In such implementations, the locations 110, 112, 114 may be geographically disparate locations that may reside in different towns, different cities, different states, and even different countries. Yet in some implementations, there may be a combination of the aforementioned implementations. For example, in some implementations, some of the locations may be within the same first structure and other locations may be within one or more other structures that are geographical disparate from the first structure.

Examples described above describe the locations as being hospital rooms and the monitoring devices as being of a type that may typically be used in a hospital room. However, the present disclosure is not limited to implementations to monitoring devices that may be used within a hospital room. Instead, in some implementations, a monitoring device such as MD-1 can be a monitoring device used to monitoring a person in the person's home. In yet other implementations, the monitoring device such as MD01 may be a wearable device such as a smart watch and a location such as location 110 can be a GPS location of an entity wearing the smart watch. In such implementations, the GPS location of the entity can be a location that is inside a building or outside a building. In some implementations, the wearable device may be a generic wearable device that is assigned to an entity and configured to monitor the entity without being tied to a user account of the entity.

Each of the plurality of monitoring devices MD-1, MD-2, MD_3, MD-x can transmit time-series data 120, 122, 124, 126 to the time-series database generation engine 140 using one or more networks 130. The time-series data 120, 122, 124, 126 can include a series of data points generated for different periods of time. Such time-series data 120, 122, 124, 126 can include, for example, waveform data such as the data generated by a heart rate machine, oxygen level machine, or the like. Such time-series data may be high frequency data or low frequency data.

The time-series data 120, 122, 124, 126 can have multiple fields. In some implementations, for example, the time-series data 120, 122, 124, 126 can include a waveform data 120a, 122a, 124a, 126a, time data 120b, 122b, 124b, 126b, and location data 120c, 122c, 124c, 126c. The waveform data 120a, 122a, 124a, 126a can be a plurality of sequential data points that each indicate an output of a monitoring device that describes an attribute of an entity monitored by the monitoring device. The time data 120*b*, 122*b*, 124*b*, 126*b*, can define a sequential period of time that includes a plurality of points in time. At least some the points in time of the time data 120*b* correspond to a point in time where each data point of the plurality of sequential data points of the waveform data 1210*a* were captured. In some implementations, the plurality of sequential datapoints can be generated closely in time such that the collection of sequential datapoints resembles a waveform. The location data 120*c*, 122*c*, 124*c*, 126*c* can include any data that identifies a location of the monitoring device that generated the time-series data. The time-series data 120, 122, 124, 126 does not include data that identifies an entity that was monitored by the monitoring device that generated the time-series data. For purposes of this specification, the entity can include any living entity that can have a vital sign monitored by a monitoring device 110-1, 112-1, 112-2, 114-1 including, but not limited to, humans, dogs, cats, or any other living entity.

The time-series database generation engine 140 can use a time-series data detection engine 142 to obtain time series data 120, 122, 124, 126 generated by monitoring devices. In some implementations, the time-series data detection engine 142 can be a network interface that detects incoming time series data 120, 122, 124, 126 as the time series data is received over the network 130. In other implementations, the time-series data detection engine 142 can be a different component than a network interface and instead obtain previously received time-series data that has been stored in a memory such as cache of the time-series database generation engine 140. The time-series data detection engine 142 can process the incoming time-series data such as time-series data 120 to generate formatted time-series data 142*a* for input to the time-series data analysis engine 144. For example, in some implementations, the time-series data detection engine 142 can format the obtained time-series data, e.g., time-series data 120 for input to the time-series data analysis engine 144. This can include, for example, removing header fields that may be associated with the time-series data 120 to facilitate transmission of the time-series data 120 from a monitoring device 110-1 to the time-series database generation engine 140 via the network 130. In some implementations, the time-series data detection engine can extract portions of the time series data relevant for input to the time-series data analysis engine 144. In some implementations, the formatted time-series data 142*a* may be the same as the time-series data, e.g., 120, that was input to the time-series data detection engine 142.

In some implementations, the time-series data detection engine 142 can function as a throttling engine that can manage the instances of time-series data 120, 122, 124, 126 provided to the time-series data analysis engine 144 at any particular time. For example, in some implementations, the time-series data detection engine 142 can manage a cache of time-series data received by the time-series database generation engine 140 and monitor the capacity of the time-series data disambiguation engine 144. Then, the time-series data detection engine 142 can provide time-series formatted time-series input data 142*a* to the time-series analysis engine 144 up to a threshold level of input capacity. If more time-series data is incoming than a threshold level capacity of the time-series data analysis engine 144, then the time-series data detection engine 142 can delay transmission of further times-series data to the time-series data analysis engine 144 for a predetermined amount of time. In some implementations, the predetermined amount of time can be a fixed period of time such as, e.g., 5 ms, 15 ms, 100 ms, 500 ms, 1 s, 5 s, 30 s, 1 m, or the like. In other implementations, the predetermined amount of time can be a period time until the time-series data detection engine 142 determines that the time-series data analysis engine 144 has capacity to accept further time-series data as an input. In some implementations, there may be multiple time-series data analysis engines 144 to improve throughput and reduced runtime and the time-series data detection engine 142 can load balance time series data across the time-series analysis engines 144 to achieve optimal performance.

The time-series data analysis engine 144 can obtain the formatted time-series input data 142*a* generated by the time-series data detection engine 142 and analyze the formatted time-series data input 142*a* to identify one or more attributes of the formatted time-series input data 142*a*. The one or more attributes of the formatted time-series input data 142*a* can include, for example, processing the formatted time-series data input data 142*a* to identify a date associated with the formatted time-series input data 142*a*, a period of time associated with the formatted time-series data 142*a*, a location associated with the time-series input data 142*a*, or a combination thereof. The formatted time-series data 142*a* can include data such as waveform data 120*a*, time data 120*b*, or both. The period of time associated with the formatted time-series data 142*a* can include a time in for an entity, a time out for an entity, or both.

The time-series data analysis engine 144 can identify a date associated with the formatted time-series input data 142*a* in a number of different ways. For example, in some implementations, the time-series data analysis engine 144 can identify a date for the formatted time-series data 142*a* based on the calendar date the formatted time-series data 142*a* was received by the time-series data analysis engine 144. The calendar can include, for example, using a system calendar. In other implementations, the date may be stored as metadata in received times-series data 120, 122, 124, or 126 and included in the formatted time-series input data 142*a*. In such implementations, the time-series data analysis engine 144 can extract the date data from the formatted time-series input data 142*a*.

The time-series data analysis engine 144 can identify a period of time associated with the formatted time-series data in a number of different ways. For example, in some implementations, the time-series data analysis engine 144 can identify a first data point in the waveform data 120*a* of the time-series data 120 and an end point in the waveform data 120*a* of time-series data 120. Then, the time-series data analysis engine 144 can determine a time associated with each identified point of the waveform data 120*a* (e.g., the first data point and the end point) using the time data 120*b* of the time series data 120. The time associated with each identified point of the waveform data 120*a* defines a time period.

The time-series data analysis engine 144 can identify a location associated with the time-series input data 120 in a number of different ways. For example, in some implementations, the time-series data analysis engine 144 can identify a location associated with the time-series data 120 by accessing metadata stored within the time-series data 120. For example, the time-series data analysis engine 144 can extract location data 120*c* from the formatted time-series input data 142*a* that was generated based on the time-series data detection engine 142 processing the time-series data 120. The location data 120*c* can be an data that identifies a location including, but not limited to, a location identifier, a GPS location, or the like. The location identifier can be any string of one or more alphanumeric characters that can be processed by the time-series data disambiguation engine 146, or some other component of the time-series database generation engine, to obtain a location of a monitoring device that originated the time-series data 120. For example, in some implementations, the location data 120c can include a binary code that can be mapped to a location such as a particular room of a hospital. Alternatively, or in addition, the location data 120c can include a GPS location. These are examples of different types of location data and do not limit the scope of the location data 120c, 122c, 126c of the present disclosure.

The time-series data analysis engine 144 can generate output data 144a that includes one or more of the date associated with the formatted time-series input data 142a, the period of time associated with the formatted time-series data 142a, and the location associated with the time-series input data 142a. The output data 144a can be provided as an input to the time-series data disambiguation engine 146.

The time-series data disambiguation engine 146 can obtain the output data 144a and generate a disambiguation query 146a that includes query parameters derived from the output data 144a. For example, the query parameters of the generated disambiguation query 146a can include the date associated with the formatted time-series input data 142a, the period of time associated with the formatted time-series data 142a, the location associated with the time-series input data 142a, or any combination thereof. The time-series data disambiguation engine 146 can execute the generated disambiguation query 146a against the entity database 150 in order to disambiguate the time series data 120a from which the output data 144a was derived.

The entity database 150 is a database that stores entity records. Each entity record 150-1, 150-2, 150-y, where y is any positive integer greater than 0, is a data structure that structures entity data into a plurality of fields. In the example of FIG. 1, each entity record can include data that identifies a date 151 an entity was at a particular location, location information 152 that identifies the particular location, a first time 153 the entity first arrived at the location, a second time 154 that the entity left the location, and an entity identifier. The values in each of the fields of the database 150 depicted in FIG. 1 are examples to convey concepts of the present disclosure and are not intended to be limiting. By way of example, examples of entity IDs in database 150 include Mary, Bob, and Jim. However, the present disclosure is not limited to use of textual names has identifiers. Instead, an entity ID can be an integer value, a binary value, a hexadecimal value, an alphanumeric value, or any other data that can be used to identifier an entity.

Execution of the disambiguation query 146a against the entity database 150 includes identifying, based on the parameters of the disambiguation query 146a, the entity record 150-1, 150-2, 150-y. Identifying an entity record based on the parameters of the disambiguation query 146a can include identifying the entity record that has at least one value one or more fields of the entity record 150-1, 150-2, 150-y that satisfies each of the one or more parameters of the disambiguation query 146a. In the event that multiple entity records are response to a particular disambiguation query 146a, the time-series data disambiguation engine 146 can refine the query results 146b to obtain a single entity record 150-1, 150-2, 150-y that is responsive to the disambiguation query 146a. Such refinement operations can include, e.g., extracting an additional parameter from the output data 144a and refining the query results 146b using the additional parameter. These refinement operations can continue until a single entity record is identified in the search results 146b that is responsive to the disambiguation query 146a. The time-series data disambiguation engine 146 can generate output data 146c that includes the entity record identified as responsive to the disambiguation query 146a. The generated output data 146c can be provided as an input to the time-series data structure generation engine 148.

The time-series data structure generation engine 148 can obtain the output data 146c generated by the time-series data disambiguation engine 146 and at least a portion of the time-series data such as time-series data 120. The time-series data structure generation engine 148 can generate an entry 148d in the time-series database 160 based on the output data 146c and the time-series data 120. For example in some implementations, the time-series data structure generation engine 148 can generate an entry 148d that includes at least (i) the entity identifier 155 from the entity record 150-1 that was obtained by the time-series data disambiguation engine 146 responsive to the query 146c and (ii) a portion of time-series data 120. The entity identifier 155 of entity record 150-1 can then be used to index the time-series data 120 that does not have any user identifying information. The time-series data structure generation engine 148 can store the generated entry 148d in the time-series database 160.

The time-series database 160 is a database that includes a plurality of indexed entries 160-1, 160-2, 160-z, where z is any positive integer greater than 0. Each indexed entry of the plurality of indexed entries 160-1, 160-2, 160-z that each correspond to indexed time-series data. Each indexed entry of the plurality of indexed entries 160-1, 160-2, 160-z can include at least an entity identifier field 161 and a time-series data field 162. The entity field 161 makes it possible for a user of a client device such as client device 170 to access time-series data for a particular entity that is stored in the time-series database 160. As a result, a user such as the entity, a physician, a nurse, machine learning model, or other user to access time-series readings associated with the entity. In some instances, there may be multiple indexed entries 160-1, 160-2, 160-z for each user such as, e.g., an indexed entry for each monitoring device 110-1, 112-1, 112-2, 114-1 that is monitoring a particular entity. In such implementations, a user device can request all time-series data for an entity and the time-series data generated by each monitoring device can be obtained and displayed for review a user of a user device.

By way of example, with reference to FIG. 1, a user of a user device 170 can submit a request 172 for time-series data for a particular patient such as Mary. The user may be Mary's physician and the time-series data may be heart rate sensor data generated by a heart rate monitor while Mary was in the hospital. In conventional systems, such heart rate data would be lost after it was output on a display of a monitoring device and may only be documented by notes taken by a doctor or nurse based on an observation of the hospital.

However, using the present disclosure, an application or web portal may present a user interface on the user device 170 that prompts the user of the user device 170 to enter one or more entity identifiers of a particular entity. The user can enter one or more requested entity identifiers for Mary. The request can include any entity identifier identifying Mary such as her name, birthdate, social security number, phone number, address, or any combination thereof. The user can instruct the user device 170 to generate a request 172 for Mary's heart rate sensor (and/or other time-series data generated by a monitoring device) and to transmit the request 172 to the time-series database search engine 180 via the network 130. The time-series database search engine 180 can generate a query 182 based on the request. The generated query 182 can have at least one parameter, which is an entity identifier. In the example of FIG. 1, the entity identifier can be data that identifies the entity Mary.

The time-series database search engine 180 can execute the generated query 182 against the time-series data base 160 and obtain query results 184 that include one or more indexed entries 160-1, 160-2, 160-z that are indexed with an entity identifier that satisfies the entity identifier in the query 162, which in this example is Mary. The indexed entry 160-1 in this example can include the entity identifier 161 Mary, the time-series data 162, or both. The time series data 162 indexed by the indexed entries 160-1, 160-2, 160-z can include all of the time series data necessary to display waveform results of Mary's heart rate sensor output including, e.g., the datapoints such as data 120a of time-series data 120 and the time data 120b of the time-series data 120. The time-series database search engine 180 can provide rendering data 186 to the user device 170 via the network 130 that, when rendered by the user device 170, causes the user device to display a graphical representation of the waveform output data output by Mary's heart rate sensor on the display of the user device 170.

In this example, there was only one indexed entry 160-1 that had an entity identifier of Mary. However, in some scenarios, the query 182 can obtain search results that include an indexed entry for each device that was used to monitor the entity identified by the parameters in the query 182. In such instances, the rendering data 186 can, when processed and rendered by the user device 170, cause the user device to display a snapshot of, e.g., a patient's vital signs as they existed in a particular moment in time. Such data is typically generated and lost by conventional systems since such data is not stored or user identified in any way in such conventional systems. However, using the techniques of the present disclosure, such waveform sensor data can be captured, stored, and associated with the particular entity that was monitored by the monitoring device so that the waveform sensor data can be analyzed by users such as healthcare professionals on demand.

FIG. 2 is a flowchart of a process 200 for disambiguating time-series data generated by a monitoring device prior to receipt of a request for retrieval of the time-series data. In general, obtaining, by one or more computers, entity independent time-series data broadcast by a monitoring device (210), determining, by one or more computers and based on the obtained entity independent time-series data, one or more attributes of the entity independent time-series data (220), generating, by one or more computers, a query that includes the one or more attributes of the entity independent time-series data (230), executing, by one or more computers, the generated query against an entity database to obtain query results that identify an entity (240), and generating, by one or more computers, data that associates the obtained entity independent time-series data with the identified entity (250). In some implementations, the process 200 can be implemented by a system of one or more computers such as the system of FIG. 1.

Figure 3:
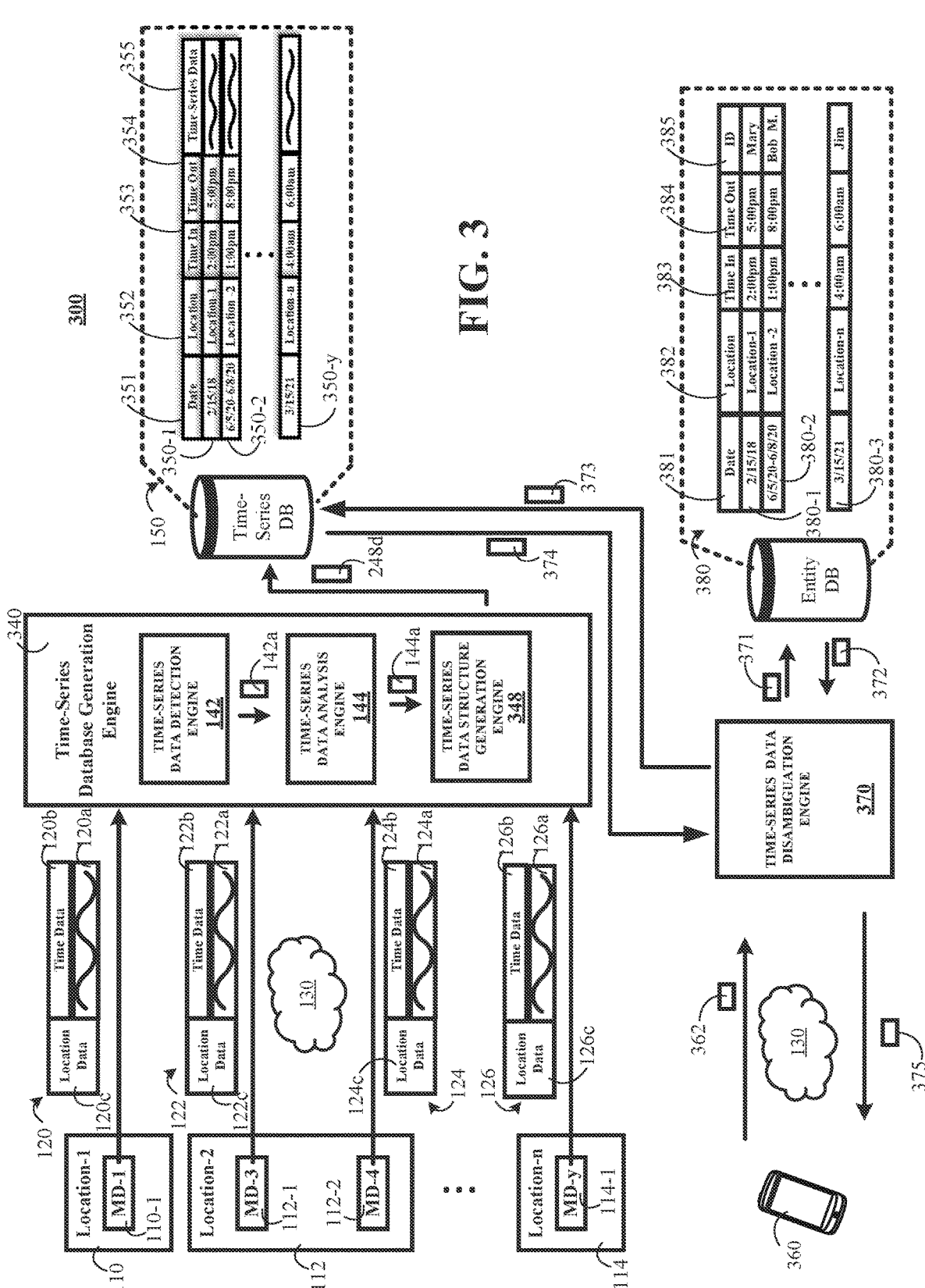
FIG. 3 is a diagram of a system for disambiguating time-series data generated by a monitoring device after receipt of a request for retrieval of the time-series data.

FIG. 3 is a diagram of a system 300 for disambiguating time-series data generated by a monitoring device after receipt of a request for retrieval of the time-series data. Like the system 100, the system 300 can include multiple monitoring devices MD-1 110-1, MD-2 112-1, MD-3 112-2, MD-x 114-1, and a network 130. These components are the same as their counterpart described with reference to FIG. 1 and operate in the same manner.

However, the system 300 can also include a time-series database generation engine 340, a time-series database 350, a user device 360, a time-series data disambiguation engine 370, and an entity database 380. Though some of these components may have the same name as their counterpart in the system of FIG. 1, each of these components may perform the same or different operations given the different process flow of the system of FIG. 3.

The time-series database generation engine 140 can use a time-series data detection engine 142 to obtain time series data 120, 122, 124, 126 generated by monitoring devices. In some implementations, the time-series data detection engine 142 can be a network interface that detects incoming time series data 120, 122, 124, 126 as the time series data is received over the network 130. In other implementations, the time-series data detection engine 142 can be a different component than a network interface and instead obtain previously received time-series data that has been stored in a memory such as cache of the time-series database generation engine 140. The time-series data detection engine 142 can process the incoming time-series data such as time-series data 120 to generate formatted time-series data 142a for input to the time-series data analysis engine 144. For example, in some implementations, the time-series data detection engine 142 can format the obtained time-series data, e.g., time-series data 120 for input to the time-series data analysis engine 144. This can include, for example, removing header fields that may be associated with the time-series data 120 to facilitate transmission of the time-series data 120 from a monitoring device 110-1 to the time-series database generation engine 140 via the network 130. In some implementations, the time-series data detection engine can extract portions of the time series data relevant for input to the time-series data analysis engine 144. In some implementations, the formatted time-series data 142a may be the same as the time-series data, e.g., 120, that was input to the time-series data detection engine 142.

In some implementations, the time-series data detection engine 142 can function as a throttling engine that can manage the instances of time-series data 120, 122, 124, 126 provided to the time-series data analysis engine 144 at any particular time. For example, in some implementations, the time-series data detection engine 142 can manage a cache of time-series data received by the time-series database generation engine 140 and monitor the capacity of the time-series data disambiguation engine 144. Then, the time-series data detection engine 142 can provide time-series formatted time-series input data 142a to the time-series analysis engine 144 up to a threshold level of input capacity. If more time-series data is incoming than a threshold level capacity of the time-series data analysis engine 144, then the time-series data detection engine 142 can delay transmission of further times-series data to the time-series data analysis engine 144 for a predetermined amount of time. In some implementations, the predetermined amount of time can be a fixed period of time such as, e.g., 5 ms, 15 ms, 100 ms, 500 ms, 1 s, 5 s, 30 s, 1 m, or the like. In other implementations, the predetermined amount of time can be a period time until the time-series data detection engine 142 determines that the time-series data analysis engine 144 has capacity to accept further time-series data as an input. In some implementations, there may be multiple time-series data analysis engines 144 to improve throughput and reduced runtime and the time-series data detection engine 142 can load balance time series data across the time-series analysis engines 144 to achieve optimal performance.

The time-series data analysis engine 144 can obtain the formatted time-series input data 142*a* generated by the time-series data detection engine 142 and analyze the formatted time-series data input 142*a*. Analyzing the formatted time-series input data 142*a* can include, for example, processing the formatted time-series data input data 142*a* to identify a date associated with the formatted time-series input data 142*a*, a period of time associated with the formatted time-series data 142*a*, a location associated with the time-series input data 142*a*, or a combination thereof.

The time-series data analysis engine 144 can identify a date associated with the formatted time-series input data 142*a* in a number of different ways. For example, in some implementations, the time-series data analysis engine 144 can identify a date for the formatted time-series data 142*a* based on the calendar date the formatted time-series data 142*a* was received by the time-series data analysis engine 144. The calendar can include, for example, using a system calendar. In other implementations, the date may be stored as metadata in received times-series data 120, 122, 124, or 126 and included in the formatted time-series input data 142*a*. In such implementations, the time-series data analysis engine 144 can extract the date data from the formatted time-series input data 142*a*.

The time-series data analysis engine 144 can identify a period of time associated with the formatted time-series data in a number of different ways. For example, in some implementations, the time-series data analysis engine 144 can identify a first data point in the waveform data 120*a* of the time-series data 120 and an end point in the waveform data 120*a* of time-series data 120. Then, the time-series data analysis engine 144 can determine a time associated with each identified point of the waveform data 120*a* (e.g., the first data point and the end point) using the time data 120*b* of the time series data 120. The time associated with each identified point of the waveform data 120*a* defines a time period.

The time-series data analysis engine 144 can identify a location associated with the time-series input data 120 in a number of different ways. For example, in some implementations, the time-series data analysis engine 144 can identify a location associated with the time-series data 120 by accessing metadata stored within the time-series data 120. For example, the time-series data analysis engine 144 can extract location data 120*c* from the formatted time-series input data 142*a* that was generated based on the time-series data detection engine 142 processing the time-series data 120. The location data 120*c* can be data that identifies a location including, but not limited to, a location identifier, a GPS location, or the like. The location identifier can be any string of one or more alphanumeric characters that can be processed by the time-series data disambiguation engine 146, or some other component of the time-series database generation engine, to obtain a location of a monitoring device that originated the time-series data 120. For example, in some implementations, the location data 120*c* can include a binary code that can be mapped to a location such as a particular room of a hospital. Alternatively, or in addition, the location data 120*c* can include a GPS location. These are examples of different types of location data and do not limit the scope of the location data 120*c*, 122*c*, 126*c* of the present disclosure.

The time-series data analysis engine 144 can generate output data 144*a* that includes one or more of the date associated with the formatted time-series input data 142*a*, the period of time associated with the formatted time-series data 142*a*, and the location associated with the time-series input data 142*a*. The formatted time-series data 142*a* can include data such as waveform data 120*a*, time data 120*b*, or both. The period of time associated with the formatted time-series data 142*a* can include a time in for an entity, a time out for an entity, or both. The output data 144*a* can be provided as an input to the time-series data structure generation engine 348.

The time-series data structure generation engine 348 can obtain the output data 144*a* generated by the time-series analysis engine 144. The time-series data structure generation engine 348 can generate an entry 348*d* in the time-series database 350 based on the output data 144*a*. For example, in some implementations, the time-series data structure generation engine 348 can generate an entry 348*d* for storage in time-series database 350 as a time-series record. The time-series data structure generation engine 148 can store the generated entry 148*d* in the time-series database 160.

The time-series database 305 can include one or more time-series records 350-1, 350-2, 350-*y*, where y is any integer number greater than 0. Each time-series record 350-1, 350-2, 350-*y* can include at least a date (or data range) 351 an entity was at a particular location, location information 352 that identifies the particular location, a first time 353 the entity first arrived at the location, a second time 354 that the entity left the location, and time-series data 355. The time series records 350-1, 350-2, 350-*y* differ from the entity record 150-1, 150-2, 150-*y* because the time-series records 350-1, 350-2, 350-*y* do not include a field that associated an entity with the time-series record. Instead, time-series records 350 are can then be used to index the time-series data 120 that does not have any entity identifying information. Instead of entity identifying information such as an entity identifier, the time-series records 350-1, 350-2, 350-*y* can be indexed using a date, location, time period, or any combination thereof. A user device such as user device 360 can subsequently retrieve time-series data describing one or more attributes of an entity as measured by a monitoring device using a time-series data disambiguation engine 370.

By way of example, with reference to FIG. 3, a user of a user device 360 can submit a request 362 for time-series data for a particular patient such as Bob. The user may be Bob's primary care physician and the time-series data may be heart rate sensor data generated by a blood-pressure monitor while Bob was in the hospital. The primary care physician may, for example, be interested to know who Bob's blood pressure fluctuated while Bob was in the hospital. In conventional systems, such blood-pressure monitor would be lost after it was output on a display of a monitoring device and may only be documented by notes taken by a doctor or nurse during observation of Bob in the hospital.

However, using the present disclosure, an application or web portal may present a user interface on the user device 360 that prompts the user of the user device 360 to enter one or more entity identifiers of a particular entity. Responsive to the prompt, the user can enter the one or more requested entity identifiers for Bob and one or more additional pieces of information about Bob. The additional pieces of information can include a date Bob was admitted to a hospital, a date Bob visited a clinic, or a data Bob went for a job with his smartwatch on. After entering the entity identifier and additional information, the user can select an icon (or physical button) that causes the user device 360 to generate a request 362. The request 362 can include an entity identifier that identifies Bob such as his name, birthdate, social security number, phone number, address, or any combination thereof. The user device 360 can transmit the request 362 to the time-series data disambiguation engine 370 via the network 130.

The time-series data disambiguation engine 370 can generate a first disambiguation query 371 based on the request 360. In the example of FIG. 3, for example, the disambiguation engine 370 can generate a disambiguation request that includes a query parameter that is an entity parameter identifying. The time-series data disambiguation engine 370 can execute the first disambiguation query 371 against the entity database 380 in order to obtain an entity record such as entity record 380-2 from the entity data 380 that include information associated with Bob.

The entity database 380 is a database that stores entity records. Each entity record 380-1, 380-2, 380-z, where z is any positive integer greater than 0, is a data structure that structures entity data into a plurality of fields. In the example of FIG. 1, each entity record can include data that identifies a date 381 an entity was at a particular location, location information 382 that identifies the particular location, a first time 383 the entity first arrived at the location, a second time 384 that the entity left the location, and an entity identifier 385. The values in each of the fields of the database 380 depicted in FIG. 3 are examples to convey concepts of the present disclosure and are not intended to be limiting. By way of example, examples of entity IDs in database 380 includes values of Mary, Bob, and Jim. However, the present disclosure is not limited to use of textual names has identifiers. Instead, an entity ID can be an integer value, a binary value, a hexadecimal value, an alphanumeric value, or any other data that can be used to identifier an entity.

Execution of the first disambiguation query 371 against the entity database 380 can include identifying, based on the parameters of the first disambiguation query 371, a particular entity record of the plurality of entity records 380-1, 380-2, 380-z. Identifying an entity record based on the parameters of the first disambiguation query 371 can include identifying an entity record that has at least one value in one or more fields of an entity record 380-1, 380-2, 380-z that satisfies each of the one or more parameters of the first disambiguation query 371. In the event that multiple entity records are response to a particular first disambiguation query 371, the time-series data disambiguation engine 370 can refine the query results 372 obtain a single entity record 380-2 that is responsive to the first disambiguation query 371.

In such implementations, for example, such refinement operations can include, e.g., the time-series data disambiguation engine 370 prompting the user for additional information about the entity Bob. In some implementations, the prompt can be a predetermined prompt. A predetermined prompt may include, for example, "please enter the date that Bob was admitted to the hospital." Alternatively, or in addition, the time-series data disambiguation engine 370 can prompt the user for additional information using a dynamic prompt. A dynamic prompt may be based generated based on data that is included in the initial search results 372. For example, assume the first disambiguation query 371 returns results 372 that include entity records 380-2 with entity identifier Bob M. and entity record 308-z with Bob S. In such a scenario, the time-series disambiguation engine 370 can generate rendering that, when rendered by the user device 360, causes the user device 360 to display a dynamic prompt asking the user of the user device 360 whether the user is interested in time-series sensor data for Bob M. or Bob S. The user of the user device 360 can provide feedback in the form of selection of a particular entity such as Bob M.

Then, the time-series data disambiguation engine 370 can select entity record 380-2 for use in continuing the disambiguation process.

The time-series data disambiguation engine 370 can then generate a second disambiguation query 373 that includes values from one or more fields of the selected entity record 380-2. By way of example, the time-series data disambiguation engine 370 can obtain the date range Jun. 5, 2020-Jun. 8, 2020 and location-2 and use these obtain values as parameters for the second disambiguation query. The time-series data disambiguation engine 370 can execute the second disambiguation query 373 against the time-series database 350 to identify one or more time-series data records 350-1, 350-2, 350-z that satisfy the parameters of the second disambiguation query 373. The time-series data disambiguation engine 370 can obtain search results 374 that are responsive to the second disambiguation query 373. In the example of FIG. 3, entity record 350-2 is returned as responsive to the second disambiguation query 373, as the values in the date field 351 ("Jun. 5, 2020-Jun. 8, 2020") and the location field 352 ("location-2") satisfy the query parameters of the second disambiguation query 373.

In the example of FIG. 3, a single time-series data record 350-2 was identified as responsive to the second disambiguation query 373. However, in some implementations, multiple time-series data records 350-1, 350-2, 350-y may be identified as responsive to the second disambiguation query 373. In the event that multiple entity records are response to the second disambiguation query 373, the time-series data disambiguation engine 370 can refine the query results 374 to obtain a single entity record 350-1, 350-2, 350-y that is responsive to the second disambiguation query 373. Such refinement operations can include, e.g., extracting an additional parameter from the entity record 380-3 and refining the query results 374 using the additional parameter. These refinement operations can continue until one or more time-series data records corresponds to a single entity are identified in the search results 374 that are responsive to the second disambiguation query 373. The one or more time-series data records corresponding to a single entity can be selected by the time-series disambiguation engine 370 for generating rendering data 375.

The one or more time-series data records 350-2 selected by the time-series disambiguation engine 370 in response to the disambiguation query can include all of the time-series data necessary to display waveform results of Bob's blood-pressure monitor output including, e.g., the datapoints such as data 120a of time-series data 120 and the time data 120b of the time-series data 120. The time-series data disambiguation engine 370 can provide rendering data 375 to the user device 360 via the network 130 that, when rendered by the user device 360, causes the user device 360 to display a graphical representation of the waveform output data output by Bob's blood-pressure monitor on the display of the user device 360.

In this example, there was only one time-series data record 350-2 that was disambiguated for Bob. However, in some scenarios, the second disambiguation query 373 can obtain search results that include time-series data record for each device that was used to monitor the entity identified by the parameters in the second disambiguation query 373. In such instances, the rendering data 375 can, when processed and rendered by the user device 360, cause the user device 360 to display a snapshot of, e.g., a patient's vital signs as they existed in a particular moment in time. Such data is typically generated and lost by conventional systems since such data is not stored or associated with an entity in any way in conventional systems. However, using the techniques of the present disclosure, such waveform sensor data can be captured, stored, and associated with the particular entity that was monitored by the monitoring device so that the waveform sensor data can be analyzed by users such as healthcare professionals on demand.

FIG. 4 is a flowchart of a process 400 for disambiguating time-series data generated by a monitoring device after receipt of a request for retrieval of the time-series data. In general, the process 400 can include obtaining, by one or more computers and from a user device, a request for sensor data for a particular entity generated by a monitoring device, wherein the request includes an entity identifier (410), obtaining, by one or more computers and using the entity identifier of the obtained request, (i) time data and (ii) location data (420), generating, by one or more computers, a disambiguation query that includes (i) the obtained time data and (ii) the obtained location data (430), executing, by one or more computers, the generated disambiguation query against a time-series database that stores entity-independent time-series data generated by a plurality of monitoring devices over time, wherein each entry in the entity-independent time-series database is a sample of sensor data generated by a particular monitoring device of the plurality of monitoring devices at a particular point in time that is indexed using (i) the particular point in time and (ii) a location of the particular monitoring device (440), obtaining, by one or more computers, a response to the executed disambiguation query that includes one or more entity-independent time-series database entries that satisfy the generated query (450), and providing, by one or more computers, rendering data that, when rendered by a user device, causes the user device to display output that corresponds to data that was included in the one or more entity-independent time-series database entries of the obtained response (460). In some implementations, the process 400 can be implemented by a system of one or more computers such as the system of FIG. 3.

Figure 5:
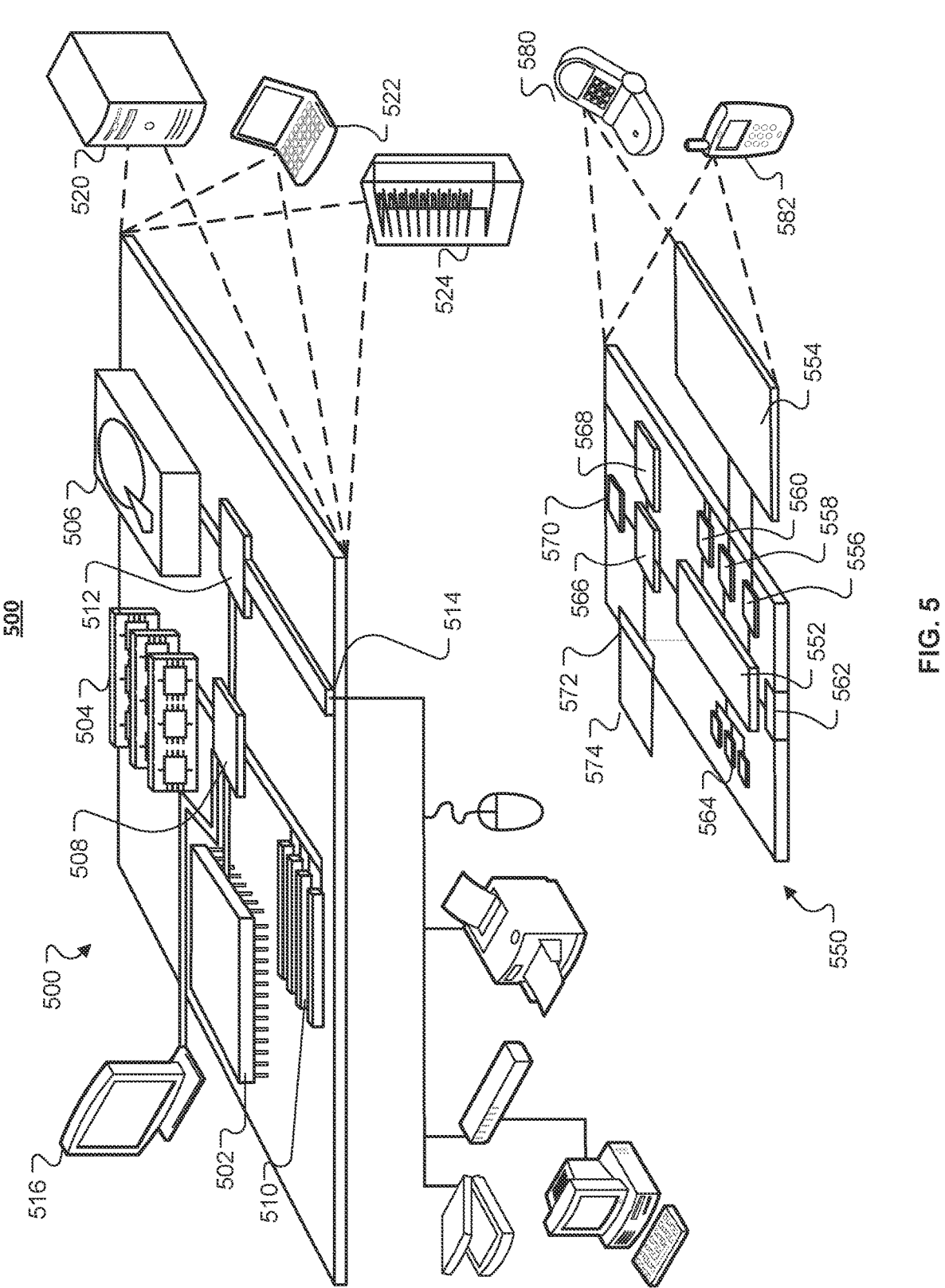
FIG. 5 is a diagram of another system for disambiguating time-series data generated by a monitoring device.

FIG. 5 is a diagram of another system for disambiguating time-series data generated by a monitoring device.

Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally, computing device 500 or 550 can include Universal Serial Bus (USB) flash drives. The USB flash drives can store operating systems and other applications. The USB flash drives can include input/output components, such as a wireless transmitter or USB connector that can be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and can be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses can be used, as appropriate, along with multiple memories and types of memory. Also, multiple computing devices 500 can be connected, with each device providing portions of the necessary operations, e.g., as a server bank, a group of blade servers, or a multi-processor system.

The memory 504 stores information within the computing device 500. In one implementation, the memory 504 is a volatile memory unit or units. In another implementation, the memory 504 is a non-volatile memory unit or units. The memory 504 can also be another form of computer-readable medium, such as a magnetic or optical disk.

The storage device 506 is capable of providing mass storage for the computing device 500. In one implementation, the storage device 506 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth intensive operations. Such allocation of functions is exemplary only. In one implementation, the high-speed controller 508 is coupled to memory 504, display 516, e.g., through a graphics processor or accelerator, and to high-speed expansion ports 510, which can accept various expansion cards (not shown). In the implementation, low-speed controller 512 is coupled to storage device 506 and low-speed expansion port 514. The low-speed expansion port, which can include various communication ports, e.g., USB, Bluetooth, Ethernet, wireless Ethernet can be coupled to one or more input/output devices, such as a keyboard, a pointing device, microphone/speaker pair, a scanner, or a networking device such as a switch or router, e.g., through a network adapter. The computing device 500 can be implemented in a number of different forms, as shown in the figure. For example, it can be implemented as a standard server 520, or multiple times in a group of such servers. It can also be implemented as part of a rack server system 524. In addition, it can be implemented in a personal computer such as a laptop computer 522. Alternatively, components from computing device 500 can be combined with other components in a mobile device (not shown), such as device 550. Each of such devices can contain one or more of computing device 500, 550, and an entire system can be made up of multiple computing devices 500, 550 communicating with each other.

The computing device 500 can be implemented in a number of different forms, as shown in the figure. For example, it can be implemented as a standard server 520, or multiple times in a group of such servers. It can also be implemented as part of a rack server system 524. In addition, it can be implemented in a personal computer such as a laptop computer 522. Alternatively, components from computing device 500 can be combined with other components in a mobile device (not shown), such as device 550. Each of such devices can contain one or more of computing device

500, 550, and an entire system can be made up of multiple computing devices 500, 550 communicating with each other.

Computing device 550 includes a processor 552, memory 564, and an input/output device such as a display 554, a communication interface 566, and a transceiver 568, among other components. The device 550 can also be provided with a storage device, such as a micro-drive or other device, to provide additional storage. Each of the components 550, 552, 564, 554, 566, and 568, are interconnected using various buses, and several of the components can be mounted on a common motherboard or in other manners as appropriate.

The processor 552 can execute instructions within the computing device 550, including instructions stored in the memory 564. The processor can be implemented as a chipset of chips that include separate and multiple analog and digital processors. Additionally, the processor can be implemented using any of a number of architectures. For example, the processor 510 can be a CISC (Complex Instruction Set Computers) processor, a RISC (Reduced Instruction Set Computer) processor, or a MISC (Minimal Instruction Set Computer) processor. The processor can provide, for example, for coordination of the other components of the device 550, such as control of user interfaces, applications run by device 550, and wireless communication by device 550.

Processor 552 can communicate with a user through control interface 558 and display interface 556 coupled to a display 554. The display 554 can be, for example, a TFT (Thin-Film-Transistor Liquid Crystal Display) display or an OLED (Organic Light Emitting Diode) display, or other appropriate display technology. The display interface 556 can comprise appropriate circuitry for driving the display 554 to present graphical and other information to a user. The control interface 558 can receive commands from a user and convert them for submission to the processor 552. In addition, an external interface 562 can be provide in communication with processor 552, so as to enable near area communication of device 550 with other devices. External interface 562 can provide, for example, for wired communication in some implementations, or for wireless communication in other implementations, and multiple interfaces can also be used.

The memory 564 stores information within the computing device 550. The memory 564 can be implemented as one or more of a computer-readable medium or media, a volatile memory unit or units, or a non-volatile memory unit or units. Expansion memory 574 can also be provided and connected to device 550 through expansion interface 572, which can include, for example, a SIMM (Single In Line Memory Module) card interface. Such expansion memory 574 can provide extra storage space for device 550, or can also store applications or other information for device 550. Specifically, expansion memory 574 can include instructions to carry out or supplement the processes described above, and can include secure information also. Thus, for example, expansion memory 574 can be provide as a security module for device 550, and can be programmed with instructions that permit secure use of device 550. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that can be received, for example, over transceiver 568 or external interface 562.

Device 550 can communicate wirelessly through communication interface 566, which can include digital signal processing circuitry where necessary. Communication interface 566 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 568. In addition, short-range communication can occur, such as using a Bluetooth, Wi-Fi, or other such transceiver (not shown). In addition, GPS (Global Positioning System) receiver module 570 can provide additional navigation- and location-related wireless data to device 550, which can be used as appropriate by applications running on device 550.

Device 550 can also communicate audibly using audio codec 560, which can receive spoken information from a user and convert it to usable digital information. Audio codec 560 can likewise generate audible sound for a user, such as through a speaker, e.g., in a handset of device 550. Such sound can include sound from voice telephone calls, can include recorded sound, e.g., voice messages, music files, etc. and can also include sound generated by applications operating on device 550.

The computing device 550 can be implemented in a number of different forms, as shown in the figure. For example, it can be implemented as a cellular telephone 580. It can also be implemented as part of a smartphone 582, personal digital assistant, or other similar mobile device.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Other Embodiments

A number of embodiments have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

The invention claimed is:

1. A method for disambiguating time-series data generated by a monitoring device, the method comprising:
    obtaining entity independent time-series data transmitted by a monitoring device that monitors an entity, wherein the entity is a patient;
    determining, based on the obtained entity independent time-series data transmitted by the monitoring device, one or more attributes of the entity independent time-series data;
    in response to determining the one or more attributes of the entity independent time-series data, generating a query that includes the one or more attributes determined based on the obtained entity independent time-series data transmitted by the monitoring device;
    executing the generated query against an entity database to obtain query results that identify the entity monitored by the monitoring device that transmits the entity independent time-series data; and
    storing data that associates the obtained entity independent time-series data with the identified entity, wherein the data comprises a data structure that includes (i) a first field structuring an entity identifier that identifies the entity and (ii) one or more second fields that include at least a portion of the entity independent time-series data.

2. The method of claim 1, wherein the entity independent time-series data transmitted by a monitoring device includes time-series data that does not include the entity identifier.

3. The method of claim 1, wherein determining, based on the obtained entity independent time-series data transmitted by the monitoring device, the one or more attributes of the entity independent time-series data comprises:
    determining a date associated with the entity independent time-series data, a period of time associated with the entity independent time-series data, or a location associated with the entity independent time-series data, as the one or more attributes of the entity independent time-series data based on the obtained entity independent time-series data transmitted by the monitoring device.

4. The method of claim 1, wherein the query results that identify the entity include the entity identifier, wherein the entity identifier is data that can be used to identify the entity.

5. A system for disambiguating time-series data generating by a monitoring device, the system comprising:
    one or more computers; and
    one or more memory devices storing instructions that, when executed by the one or more computers, cause the one or more computers to perform operations, the operations comprising:
        obtaining entity independent time-series data transmitted by a monitoring device that monitors an entity, wherein the entity is a patient;
        determining, based on the obtained entity independent time-series data transmitted by the monitoring device, one or more attributes of the entity independent time-series data;
        in response to determining the one or more attributes of the entity independent time-series data, generating a query that includes the one or more attributes determined based on the obtained entity independent time-series data transmitted by the monitoring device;
        executing the generated query against an entity database to obtain query results that identify the entity monitored by the monitoring device that transmits the entity independent time-series data; and
        storing data that associates the obtained entity independent time-series data with the identified entity, wherein the data comprises a data structure that includes (i) a first field structuring an entity identifier that identifies the entity and (ii) one or more second fields that include at least a portion of the entity independent time-series data.

6. The system of claim 5, wherein the entity independent time-series data transmitted by a monitoring device includes time-series data that does not include the entity identifier.

7. The system of claim 5, wherein determining, based on the obtained entity independent time-series data transmitted by the monitoring device, the one or more attributes of the entity independent time-series data comprises:
    determining a date associated with the entity independent time-series data, a period of time associated with the entity independent time-series data, or a location associated with the entity independent time-series data, as the one or more attributes of the entity independent time-series data based on the obtained entity independent time-series data transmitted by the monitoring device.

8. The system of claim 5, wherein the query results that identify the entity include the entity identifier, wherein the entity identifier is data that can be used to identify the entity.

9. One or more non-transitory computer-readable media storing instructions that, when executed by one or more computers, cause the one or more computers to perform operations for disambiguating time-series data generating by a monitoring device, the operations comprising:

obtaining entity independent time-series data transmitted by a monitoring device that monitors an entity, wherein the entity is a patient;

determining, based on the obtained entity independent time-series data transmitted by the monitoring device, one or more attributes of the entity independent time-series data;

in response to determining the one or more attributes of the entity independent time-series data, generating a query that includes the one or more attributes determined based on the obtained entity independent time-series data transmitted by the monitoring device;

executing the generated query against an entity database to obtain query results that identify the entity monitored by the monitoring device that transmits the entity independent time-series data; and storing data that associates the obtained entity independent time-series data with the identified entity, wherein the data comprises a data structure that includes (i) a first field structuring an entity identifier that identifies the entity and (ii) one or more second fields that include at least a portion of the entity independent time-series data.

10. The one or more computer-readable media of claim 9, wherein the entity independent time-series data transmitted by a monitoring device includes time-series data that does not include the entity identifier.

11. The one or more computer-readable media of claim 9, wherein determining, based on the obtained entity independent time-series data transmitted by the monitoring device, the one or more attributes of the entity independent time-series data comprises:

determining a date associated with the entity independent time-series data, a period of time associated with the entity independent time-series data, or a location associated with the entity independent time-series data, as the one or more attributes of the entity independent time-series data based on the obtained entity independent time-series data transmitted by the monitoring device.

12. The one or more computer-readable media of claim 9, wherein the query results that identify the entity include the entity identifier, wherein the entity identifier is data that can be used to identify the entity.

* * * * *